Jan. 28, 1958 R. A. ANDRÉ ET AL 2,821,691

MATRIX FOR DETACHABLY MOUNTING ELECTRICAL COMPONENTS

Filed Aug. 30, 1954 2 Sheets-Sheet 1

Inventors
R. A. ANDRE - L. J. C. NYS
By Philip M. Bolton
Attorney

MATRIX FOR DETACHABLY MOUNTING ELECTRICAL COMPONENTS

Filed Aug. 30, 1954 2 Sheets-Sheet 2

Inventors
R. A. ANDRE - L. J. C. NYS
By Philip M. Bolton
Attorney 2,821,691
Patented Jan. 28, 1958

2,821,691

MATRIX FOR DETACHABLY MOUNTING ELECTRICAL COMPONENTS

Raoul Alfred André and Louis Jacques Ghislain Nys, Antwerp, Belgium, assignors to International Standard Electric Corporation, New York, N. Y., a corporation of Delaware Application August 30, 1954, Serial No. 453,060
Claims priority, application Belgium November 7, 1953
10 Claims. (Cl. 339—150)

Figures 1, 2, 5:
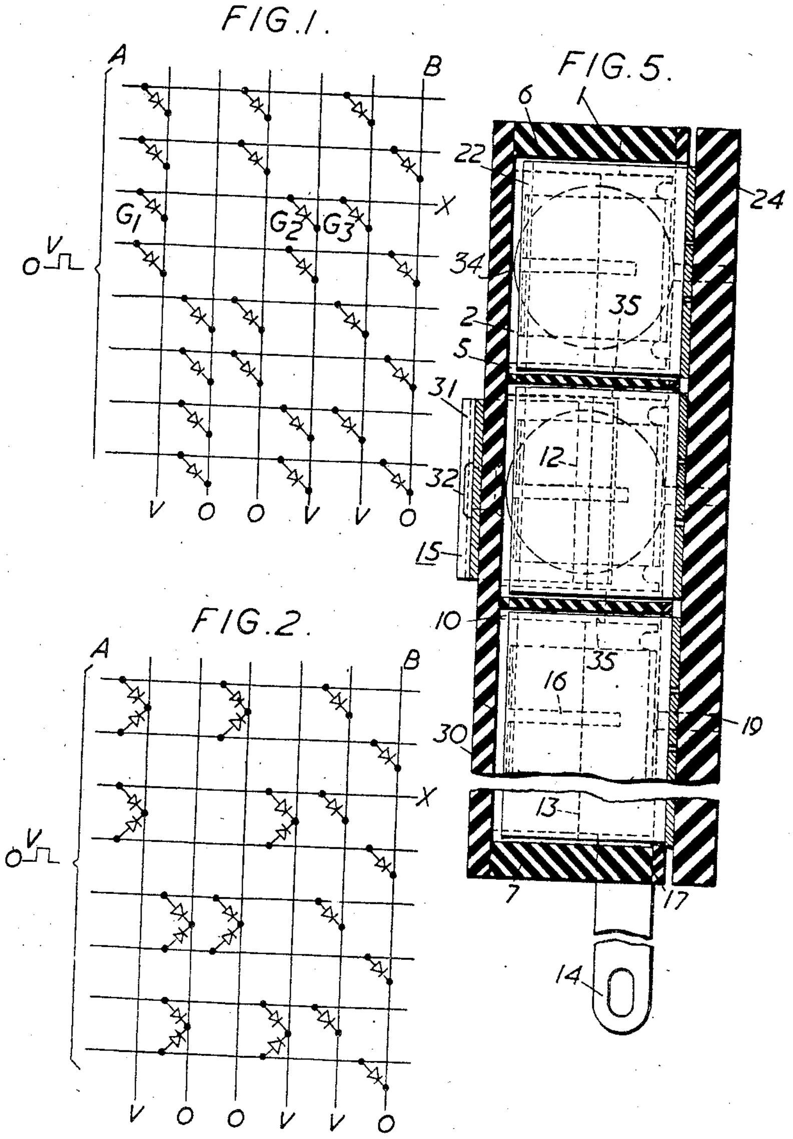

The invention relates to a mounting arrangement for electrical components and more particularly to one which is applicable for mounting so-called rectifier matrices which are now increasingly used in telecommunications and other fields. It is to be understood, however, that the invention may also be applicable to other electrical components of the dipole type.

In relation to rectifiers, various methods for mounting them are already known especially with respect to small rectifiers of the disc type such as the selenium rectifiers. For example, when the electrical circuit includes a plurality of rectifiers serially connected, e. g. a Graetz bridge, the tubular casing arrangement disclosed in the United States Patent No. 2,408,052, issued September 24, 1946, can be usefully applied. In the case of an electrical circuit comprising rectifiers matrices of the type disclosed in the article entitled "Rectifier Networks for Multi-Position Switching" by Brown & Rochester, published in the Proceedings of the Institution of Radio Engineers of February 1949, pages 139 through 147, such a tubular casing arrangement is not very well suited to the problem since the rectifiers forming the matrix would have to be set into several tubular casings and there would still remain many soldered connections to be effected between the rectifiers in the various casings, although the purpose of the mounting is essentially to avoid those and to make any defective rectifier easily removable from the assembly to be replaced by a new one. For small elements, it is advantageous to avoid soldering as much as possible since this becomes a rather delicate operation if the rectifiers adjacent to the soldering points are not to be damaged.

The object of the invention is to provide a mounting arrangement for rectifiers forming an electrical matrix network, which retains the form of the matrix and permits the mounting of rectifiers without soldering or additional wiring, as well as their easy replacement.

In accordance with the main characteristic of the invention, in a mounting arrangement for electrical components comprising a first and a second set of electrical conductors, and a plurality of two terminal electrical components each to be connected between pairs of conductors one from each set, the conductors of the first set are parallel while those of the second set are perpendicular to those of the first and spacings are obtained at each crosspoint of a conductor of one set with one of the other set, the conductors of one or both set(s) are resilient at the said crosspoints, and the said components can be inserted and held at an appropriate crosspoint between a conductor of one set and one of the other.

In accordance with another characteristic of the invention, conductors are used which have two opposite conductive faces at the crosspoints and each set of conductors which has two opposite faces, forms twin spaced crosspoints with the conductors of the other set into which two separate components can be inserted and held.

In accordance with another characteristic of the invention, the conductors in both sets are each provided with a number of extensions corresponding to the number of conductors of the other set and all said extensions are in parallel planes, the extensions on the conductors of at least one set being resilient and said components being inserted and held at the appropriate crosspoint between an extension on a conductor of one set and an extension on a conductor of the other.

In accordance with yet another feature of the invention, the conductors of the first set are separated by an insulated layer from those of the second set and the extensions on the conductors of one set pass through corresponding openings in said layer.

Figures 3, 4:
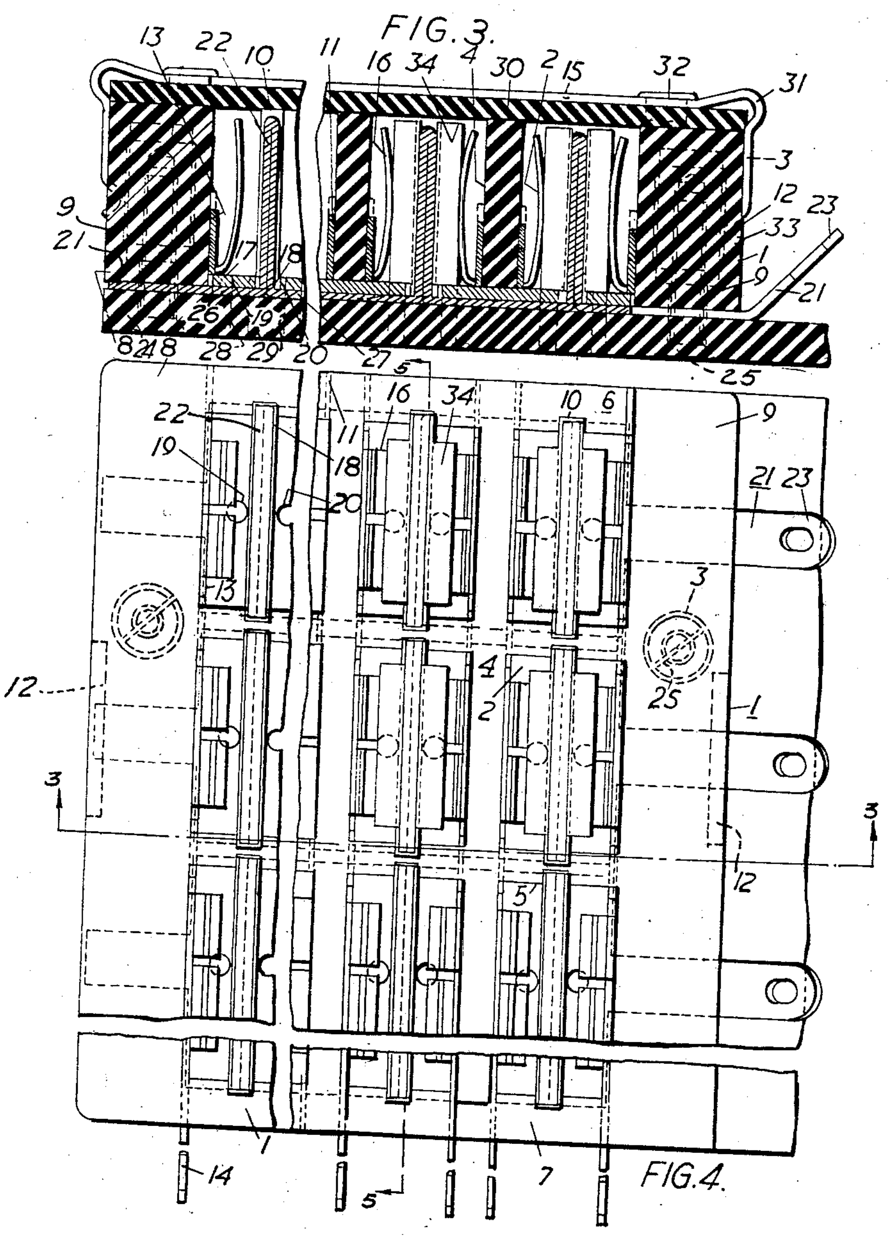

The above mentioned and other objects and features of the invention will become more apparent and the invention itself will be best understood by referring to the following description of an embodiment taken in conjunction with the accompanying drawings which represent:

Fig. 1, an electrical circuit using a rectifier matrix;

Fig. 2, the circuit of Fig. 1 but shown in a different way;

Fig. 3, a sectional front view of a mounting arrangement for the rectifiers forming the circuit of Fig. 2;

Fig. 4, a plan view of the same arrangement;

Fig. 5, a sectional end view of the same arrangement.

Referring to Fig. 1, the circuit therein can for example be used as an electronic selector by connecting together all the horizontal conductors on the A side through individual resistors (not shown), while the horizontal conductors are left as they are shown on the B side. Then, if a positive impulse from O volt to +V volts is applied at the common input of the horizontal conductors, this impulse can be directed to any desired outlet on the B side by applying a suitable combination of potentials to the vertical conductors. If potentials of +V volts are applied to the first, the fourth and the fifth vertical conductor, starting from the left, as shown, while O bias is imposed on the remaining three vertical conductors, the rectifiers $G_1$, $G_2$ and $G_3$ will be non-conductive whereby the input pulse will be able to reach point $x$. The pulse will reach that outlet only, since for all the other outlets there will be at least one of the three rectifiers connected to various vertical conductors which will be made conductive, whereby the input pulse will not be able to reach the other outlets.

The circuit of Fig. 1 can also be represented, as shown in Fig. 2, with the horizontal conductors considered as pairs of adjacent conductors.

The embodiment shown in Figs. 3, 4 and 5 permits the mounting of the 24 rectifiers used in the rectifier matrices, shown in Figs. 1 and 2, in a structure which is a physical image of the circuit shown in Fig. 2. The physical matrix comprises a main body 1 subdivided into small cases such as 2, which extend completely through it. This body 1 can be constructed or moulded from an insulating material. In the case of a moulding, threaded sockets, such as 3, are sunk in the mass. The partitions, such as 4, 5, 6 and 7 which form the cases 2, do not have the same height as the reinforced partitions 8 and 9 which border the main body 1, although the tops of all the partitions are in alignment. The partitions, such as 5, 6 and 7, are provided with grooves, such as 10, at the center of each casing 2, which grooves are parallel to the partitions 4 and extend the full height of the partitions. Also the partitions, such as 5, 6, and 7, are provided with slots, such as 11, at each side of the partitions 4 and at the insides of partitions 8 and 9, and these slots are parallel with the partitions 4, 8 and 9 and extend from the bottom up to a certain height in order to permit the insertions of flat conductors 13 which extend completely through the main body from the partition 6 to the partition 7. The reinforced partitions 8 and 9 are hollowed at 12 for the purpose of attaching a cover 15 which will be described later.

The flat conductors, such as 13, are placed in the slots 11 and are terminated by soldering terminals 14 which project beyond the partition 7. Each of these conductors 13 is provided with a pair of extensions 16 within each casing 2 through which it passes and these extensions may be integral with the bottom edge of the conductor, being bent towards the center of the casing and curved up to form resilient contact members facing the center of the casing. It will be noted that the conductors 13 are mounted without play through the slots 11 in order to avoid pressure differences on the resilient contacts 16. Further, the longitudinal displacement of the conductors 13 is prevented by means of slots such as 35, provided in the body of the conductors (Fig. 5) and engaging the partitions 5, 6 and 7. A plate 17 made out of insulating material is inserted below the conductors 13 and fits between the reinforced partitions 8 and 9, as shown in Fig. 3. This plate 17 offers rectangular openings, such as 18, which have the same length as the distance separating two opposite grooves 10 in the same case 2, the width of these openings being the same as those of the grooves 10. Further, round perforations, such as 19 and 20, are arranged on both sides of each opening 18. The purpose of these will be explained later.

As shown, conductors, such as 21, are each made out of a flat strip, folded upon itself at a number of spaced places along the length thereof in order to offer projections or fixed contacts 22 which pass through the openings 18 and are engaged in the grooves 10 of each case 2. The body of the conductor is held against the plate 17 and the reinforced partitions 8 and 9. It is terminated by a soldering terminal 23 which projects beyond the reinforced partition 9.

A base plate 24 maintains the assembly of the conductors 13 and 21 with the plate 17 inside the main body 1, by means of several screws, such as 25, fitted in the sockets 3 (the sockets and screws are not represented in Fig. 5 to simplify the latter). This base plate 24 can have any appropriate shape in order to fix this matrix structure in any desired location. This base plate 24 and the conductors 21 are also provided with perforations 28, 29 and 26, 27, respectively, which correspond to those (19, 20) in the plate 17.

The matrix structure thus assembled can be closed if desirable by means of the cover 15 which is only shown in Figs. 3 and 5. This cover comprises an insulating plate 30, covering at least the area of the main body 1, and springs, such as 31. These springs are fixed to the cover by means of rivets 32. The ends 33 of these springs 31 are arranged to engage the recesses 12 and maintain the cover 15 upon the main body. As soon as the cover is removed, the rectifiers, such as $G_1$ in Fig. 1 and 34 in Fig. 3, can be inserted in the cases, such as 2, each of which can contain two rectifiers, such as 34, on both sides of the fixed contact 22. The pressure of the resilient contacts 16 is sufficient to provide an adequate electrical contact, especially in view of the edge mounting of conductors 13. By inserting a thin rod through the perforations, such as 28, 26 and 19, previously mentioned, it will be possible to remove any defective rectifier, such as 34.

To realize the structure diagrammatically shown by the circuit of Fig. 2, the matrix mounting arrangement shown in Figs. 3, 4 and 5 will have to be provided with six conductors, such as 21, and with eight conductors, such as 13. Rectifiers, such as 34, can then be inserted in the appropriate cases. When no rectifier is to be used in a case, an insulated disc can be inserted in order to avoid any possibility of an undesired contact between the two conductors 13 and 21. Also, should it be desired to interconnect directly one type of conductor with the other, a small conductive disc could be inserted in the appropriate case.

While the principles of the invention have been described above in connection with specific apparatus, it is to be clearly understood that this description is made only by way of example and not as a limitation on the scope of the invention.

We claim:

1. A matrix for mounting a plurality of electrical components, comprising a first group of substantially parallel conductors, each of said conductors extending first in one direction, then extending a given distance in another direction approximately perpendicular to said one direction, being folded back on itself for the same distance to form a perpendicular extension and then continuing in said one direction, each of said conductors having a plurality of such spaced perpendicular extensions; a second group of substantially parallel conductors extending transverse to the conductors of said first group, each of said conductors having resilient portions opposing the perpendicular extensions of the conductors in said first group, whereby the components may be mounted between a pair of conductors, one from each group.

2. The matrix according to claim 1, wherein said perpendicular extensions occur at equal intervals along each of said first-group of conductors, the extensions being aligned transversely in the group.

3. The matrix according to claim 1, wherein said resilient portions are in the form of fingers extending substantially perpendicular from said conductor, each finger and an opposing perpendicular extension forming a clip, by which a component is securely held.

4. The matrix according to claim 3, wherein two fingers extending respectively from two conductors of said second group are mounted on opposite sides of one of said perpendicular extensions from a conductor in said first group, whereby a pair of components may be mounted between two conductors of said second group and one conductor of said first group.

5. The arrangement according to claim 4, wherein the conductors of both groups are provided with a number of fingers and extensions respectively corresponding to the number of conductors of the other set and that all said extensions are in parallel planes.

6. The matrix according to claim 4, and further comprising a housing divided into compartments, each of said compartments being dimensioned to enclose a perpendicular extension and a pair of fingers, extending respectively from a pair of conductors, on opposite sides of said extension.

7. The matrix according to claim 6, wherein said housing comprises a top and a bottom, said first group of conductors mounted on said bottom, and said second group of conductors overlying said first group and insulated therefrom.

8. The matrix according to claim 7, wherein said bottom is apertured, the apertures being located directly below the space for said components, whereby a component may be ejected from its position between the extension and finger by inserting a tool in said aperture and dislodging said component.

9. Mounting arrangement as claimed in claim 7, wherein the conductors of the first group are separated by an insulating layer from those of the second group and that the extensions on the conductors of said first group pass through openings in said layer.

10. Mounting arrangement as claimed in claim 9, in which said conductors are flat strips.

References Cited in the file of this patent

UNITED STATES PATENTS 2,151,433 MacTwiggan ............ Mar. 21, 1939
2,665,399 Lingel .................. Jan. 5, 1954